Patented Apr. 7, 1953

2,634,248

UNITED STATES PATENT OFFICE 2,634,248

VINYL CHLORIDE POLYMERS PLASTICIZED WITH DIALKYL ESTERS OF BIPHENYL-DICARBOXYLIC ACID

Joachim Dazzi, Dayton, Ohio, assignor to Monsanto Chemical Company, St. Louis, Mo., a corporation of Delaware No Drawing. Application September 14, 1949, Serial No. 115,779

11 Claims. (Cl. 260—31.8)

This invention relates to compounds useful as plasticizers, particularly in vinyl chloride resins. More specifically the invention relates to plasticized vinyl chloride resins made by the incorporation of certain alkyl esters of biphenyl dicarboxylic acids.

The primary purpose of this invention is to provide new plasticized compositions having improved flexibility and capacity for retaining their desirable properties at elevated temperatures. A further purpose of this invention is to provide useful general purpose plasticizers. A still further purpose of this invention is to provide a method of preparing valuable resinous compositions from vinyl chloride polymers.

It has been found that the alkyl esters of biphenyl dicarboxylic acid wherein the alkyl group has from two to ten carbon atoms are useful in plasticizing vinyl chloride polymers. The use of homologous esters prepared from the alcohols having fewer than four carbon atoms are in general too volatile for developing optimum properties. Similarly, it has been found that the use of the higher homologous esters having more than ten carbon atoms, for example the dilauryl esters, are incompatible in many of the vinyl resins. Thus, useful esters for the practice of this invention are the esters of p,p'-biphenyl dicarboxylic acid, the corresponding meta- and ortho-acids, the mixed acids, such as para- and ortho-biphenyl dicarboxylic acid, and the acids having both carboxyl groups substituted on the same benzene ring. The biphenyl dicarboxylic acid may be esterified with any alkyl or alkoxyalkyl alcohol having between two and ten carbon and oxygen atoms, for example the ethyl, propyl, butyl, amyl, hexyl, octyl, nonyl and decyl alcohols of either straight or branched chain, ethyl Carbitol, butyl Cellosolve and other oxyalkyl alcohols.

The dicarboxylic acids from which the new esters are prepared may be synthesized from biphenyl by alkylation followed by the oxidation of the resulting dialkylbiphenyls. This method usually prepares mixtures of various isomeric acids which may be used without separation. Other acids may be prepared by the oxidation of phenanathrene or by any of the conventional methods for preparing dicarboxylic acids. The esters are prepared from the dicarboxylic acids by conventional esterification procedures, for example heating a mixture of the desired acid and alcohol in the presence of a suitable esterification catalyst, such as sulfuric acid, p-toluene sulfonic acid and benzene sulfonic acid. The resulting esters can thereafter be separated from their impurities by fractional distillation procedures. Other purification methods, such as washing with aqueous alkali to remove acids, and treatment with clay or charcoal may be used.

The new esters are valuable plasticizers for polyvinyl chloride and copolymers of more than 70 percent of vinyl chloride and up to 30 percent of other polymerizable monomers copolymerized therewith, for example vinyl acetate and other vinyl esters of monocarboxylic acids, ethyl maleate, ethyl fumarate and other alkyl esters of maleic and fumaric acids.

The plasticizers are blended with the vinyl resin in the conventional manner, for example by mixing on a roll mill, a Banbury type mixer or any other suitable mixing device. The plasticizers are used in proportions necessary to achieve the desired plasticity. Although the quantity of plasticizer will depend upon the particular polymer to be plasticized and upon its molecular weight it is generally found that from five to 50 percent of plasticizer will in most cases produce a satisfactory composition for general utility. Such quantity of plasticizer will generally remain as a permanent part of the vinyl resin and the modified vinyl resin so prepared will not deteriorate or become embrittled by reason of the loss of the plasticizer during use.

The value of the plasticizers are estimated by three tests (1) compatibility (2) volatility and (3) Clash-Berg flex temperature. The compatibility is determined by visual inspection, clarity being a requisite in most applications for vinyl chloride polymers. The volatility is estimated by the test of heating at 105° C. for 24 hours and measuring the percentage of the plasticizers evaporated by loss of weight. The Clash-Berg flex temperature is determined by cooling the polymer sample to about —50° C. and observing the change in the modulus of rigidity as the sample warms up to room temperature, the flex temperature being that at which the modulus of rigidity is 135,000 pounds per square inch. Of these tests the compatibility is of primary importance while the others are only critical for certain applications. If the polymer is to be subjected to outside weather conditions flex temperatures of —10 to —30° C. are desirable, otherwise 0° C. is satisfactory. If the polymer is to be subjected to elevated temperatures a volatility of five to ten percent is advantageous, otherwise volatilities as high as 25 percent are often not objectionable. The volatilities and flex temperature, of polymer plasticizer blends are difficult to predict and often have no apparent relationship to the physical constants of the plasticizer.

The new plasticizers are of general utility in softening vinyl chloride polymers. They may be used as the only plasticizing component in a compounded vinyl chloride polymer or they may be used in conjunction with other plasticizers.

Further details of the practice of this invention are set forth with respect to the following specific examples.

*Example 1*

A mixture of n-butyl esters of various biphenyl dicarboxylic acids containing a substantial proportion of n-butyl esters of m,m'-biphenyldicarboxylic acids, were evaluated as a plasticizer by milling 40 parts by weight of the esters with 60 parts of polyvinyl chloride and one part of a standard, commercially available heat stabilizer. The thoroughly milled sample was molded into appropriate test pieces and tested by means of the Clash-Berg flex temperature procedure and for volatility. The compositions were found to have a flex temperature of $-13°$ C. and a volatility of 1.4 percent.

*Example 2*

Using the procedure described in the preceding example, a mixture of di-2-ethylhexyl esters of biphenyldicarboxylic acids were evaluated. They were found to have a flex temperature of $-18°$ C. and a volatility of 0.63 percent.

*Example 3*

Using the procedure of Example 1, the di-2-ethylhexyl ester of o,o'-biphenyldicarboxylic acid was tested and found to have a flex temperature of $-22°$ C. and a volatility of 0.88 percent.

The invention is defined by the following claims:

1. A plasticized vinyl chloride resin which comprises a polymer of at least about 70 percent of vinyl chloride and up to about 30 percent of a copolymerizable monomer, containing intimately dispersed therein from five to 50 percent by weight, based on the plasticized composition, of a dialkyl ester of biphenyldicarboxylic acid, wherein the alkyl radicals contain from four to ten carbon atoms.

2. A vinyl chloride resin, which comprises polyvinyl chloride, said resin containing from five to 50 percent by weight, based on the plasticized composition, of a dialkyl ester of biphenyldicarboxylic acid, wherein the alkyl radicals contain from four to ten carbon atoms.

3. A vinyl chloride resin, which comprises polyvinyl chloride, said resin containing from five to 50 percent by weight, based on the plasticized composition, of the di-2-ethylhexyl ester of o,o'-biphenyldicarboxylic acid.

4. A vinyl chloride resin, which comprises polyvinyl chloride, said resin containing from five to 50 percent by weight, based on the plasticized composition, of the di-2-ethylhexyl ester of m,m'-biphenyldicarboxylic acid.

5. A vinyl chloride resin, which comprises polyvinyl chloride, said resin containing from five to 50 percent by weight, based on the plasticized composition, of a mixture of di-2-ethylhexyl esters of biphenyldicarboxylic acid.

6. A vinyl chloride resin, which comprises polyvinyl chloride, said resin containing from five to 50 percent by weight, based on the plasticized composition, of the di-n-butyl ester of m,m'-biphenyldicarboxylic acid.

7. A vinyl chloride resin, which comprises a copolymer of at least 70 percent vinyl chloride and up to 30 percent of a monomer of the group consisting of the vinyl esters of carboxylic acid, the alkyl maleates and the alkyl fumarates, said resin containing from five to 50 percent by weight, based on the plasticized composition, of a dialkyl ester of biphenyldicarboxylic acid, wherein the alkyl radicals contain from four to ten carbon atoms.

8. A vinyl chloride resin, which comprises a copolymer of at least 70 percent vinyl chloride and up to 30 percent of a monomer of the group consisting of the vinyl esters of carboxylic acid, the alkyl maleates and the alkyl fumarates, said resin containing from five to 50 percent by weight, based on the plasticized composition, of the di-2-ethylhexyl ester of o,o'-biphenyldicarboxylic acid.

9. A vinyl chloride resin, which comprises a copolymer of at least 70 percent vinyl chloride and up to 30 percent of a monomer of the group consisting of the vinyl esters of carboxylic acid, the alkyl maleates and the alkyl fumarates, said resin containing from five to 50 percent by weight, based on the plasticized composition, of the di-2-ethylhexyl ester of m,m'-biphenyldicarboxylic acid.

10. A vinyl chloride resin, which comprises a copolymer of at least 70 percent vinyl chloride and up to 30 percent of a monomer of the group consisting of the vinyl esters of carboxylic acid, the alkyl maleates and the alkyl fumarates, said resin containing from five to 50 percent by weight, based on the plasticized composition, of a mixture of di-2-ethylhexyl esters of biphenyldicarboxylic acid.

11. A vinyl chloride resin, which comprises a copolymer of at least 70 percent vinyl chloride and up to 30 percent of a monomer of the group consisting of the vinyl esters of carboxylic acid, the alkyl maleates and the alkyl fumarates, said resin containing from five to 50 percent by weight, based on the plasticized composition, of the di-n-butyl ester of m,m'-biphenyldicarboxylic acid.

JOACHIM DAZZI.

REFERENCES CITED

The following references are of record in the file of this patent:

UNITED STATES PATENTS

| Number | Name | Date |
|---|---|---|
| 1,848,724 | Jaeger | Mar. 8, 1932 |
| 2,005,414 | Dykstra | June 18, 1935 |
| 2,395,581 | Richter | Feb. 26, 1946 |